United States Patent [19]

Hamilton et al.

[11] Patent Number: 5,068,755
[45] Date of Patent: Nov. 26, 1991

[54] SECTOR PULSE GENERATOR FOR HARD DISK DRIVE ASSEMBLY

[75] Inventors: Robert G. Hamilton, Canoga Park; Robert J. Coombes, Moorpark, both of Calif.

[73] Assignee: Micropolis Corporation, Chatsworth, Calif.

[21] Appl. No.: 532,280

[22] Filed: Jun. 1, 1990

[51] Int. Cl.⁵ .................. G11B 15/18; G11B 5/012; G11B 5/55
[52] U.S. Cl. ......................... 360/72.1; 360/69; 360/72.2
[58] Field of Search .............. 360/72.1, 72.2, 69

[56] References Cited

U.S. PATENT DOCUMENTS 4,680,653  7/1987  Ng et al. ................. 360/72.2
4,772,962  9/1988  Tanaka et al. ............. 360/72.2 X
4,775,969  10/1988 Osterlund ................. 360/72.2 X
4,789,911  12/1988 Fukushima et al. ......... 360/72.2
4,847,708  7/1989  Furuyama ................. 360/72.1 X Primary Examiner—John H. Wolff
Attorney, Agent, or Firm—Poms, Smith, Lande & Rose

[57] ABSTRACT

A sector pulse generator circuit for a hard disk drive assembly includes an angular position counter, a sector counter, a sector limit register, and a pulse generator. The circuit generates a sector pulse when the count in the angular position counter equals the count in the sector counter. When the count in the angular position counter exceeds the count in the sector counter, the sector counter is incremented by the number of clock pulses in a sector of the current track. The sector limit register stores the number of complete sectors in the current track.

19 Claims, 3 Drawing Sheets

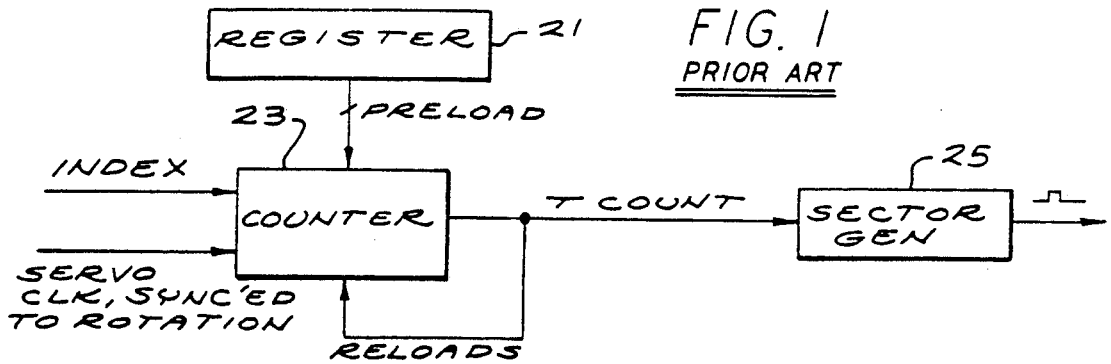
FIG. 1 PRIOR ART
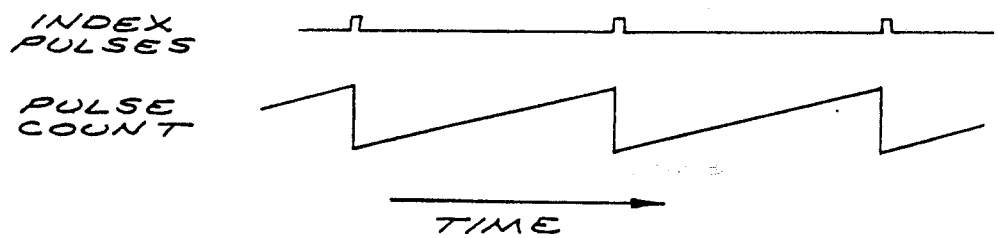
FIG. 3
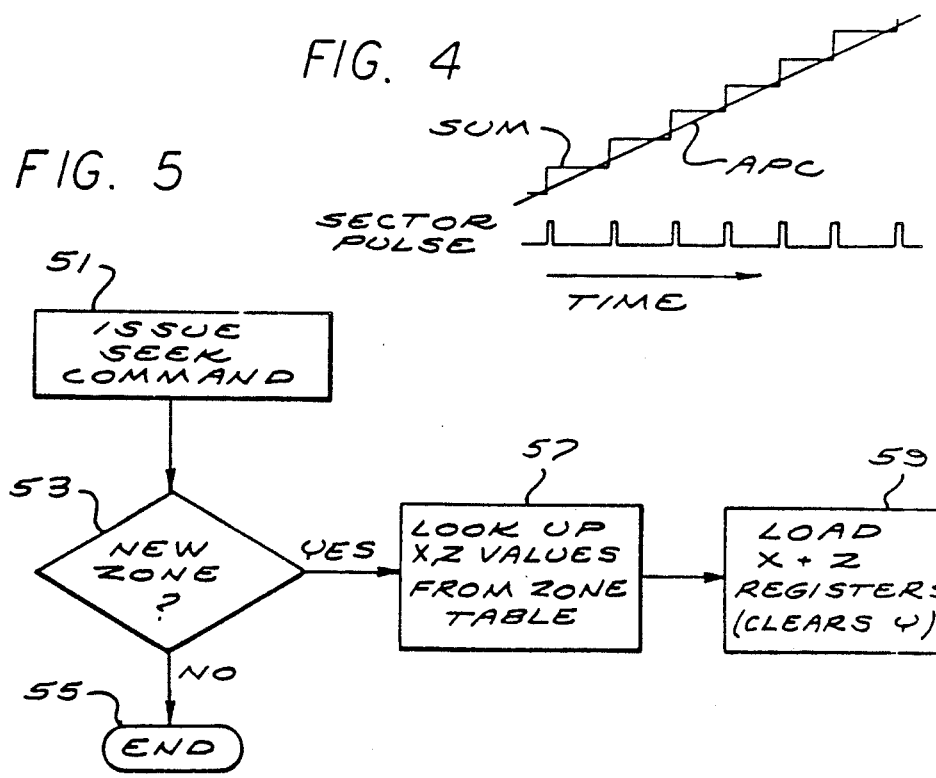
FIG. 4
FIG. 5

SECTOR PULSE GENERATOR FOR HARD DISK DRIVE ASSEMBLY

FIELD OF THE INVENTION

The invention relates in general to apparatus and methods for digital storage systems and more particularly to Winchester or hard disk drive data storage systems.

BACKGROUND OF THE INVENTION

Digital data may be stored on flexible or "floppy" disks or on hard or Winchester-type disks by the magnetization of successive small areas on the magnetic surface of the disk, by a magnetic head or "slider", as the disk rotates. The density of digital storage on hard disk memory systems is in the order of 10 or 20 times the density achieved with floppy disk memory systems.

Digital data processing systems usually operate in the binary system rather than in the decimal system, with numbers being represented by binary digits or "bits," usually represented by "1's" and "0's." Groups of eight bits of binary information are referred to as "bytes." Hard disk drives of the nominal 5¼ inch disk size vary in their storage capacity, with some being capable of storing more than a billion bytes of digital information.

Typically the surfaces of hard disks are divided into circular tracks. Tracks are further subdivided into sectors. A sector comprises a predetermined portion of the arc of a track. A fairly recent development is grouping tracks into several zones, each with a different data recording frequency in order to maximize data storage capacity. Typically, tracks located in zones further from the center of the disk have more sectors than tracks located in zones closer to the center, due to a higher data frequency at the outer radius. Though each data-bearing sector within a zone is the same size, the last partial sector on a track is typically a "runt" or incomplete sector which is not used to store data. The computer system, specifically the hard disk drive assembly portion of the computer system, uses the concept of tracks, sectors and zones as a means of defining data storage areas on the disks.

The hard disk drive assembly must generate a "sector pulse" signal at the beginning of each data-bearing sector in order to trigger the drive controller's data sequencer.

One prior art approach to generating sector pulses in shown in FIG. 1. A register 21 is used to store the number of bytes in a sector. That value is pre-loaded into the counter 23. The counter 23 counts down in synchronism with the servo-clock which generates one pulse per byte. The counter generates a signal T-count when it reaches zero which causes the sector generator 25 to generate a sector pulse. Also, when the counter 23 reaches zero, it reloads to the value it had earlier received from register 21 and again begins counting down. The prior art system shown in FIG. 1 is unable to take full advantage of the new concept of dividing disk surfaces into zones with different zones having different sector sizes and a different number of sectors, because when a head switches from a track in one zone to a new track in a new zone, the system cannot determine the sector start locations until one revolution is completed and the index, marking the beginning of the track, is passed.

Some currently existing systems which are utilized with the concept of zones employ what is called "soft sectoring." A soft sectoring system includes sector marks encoded directly on the data surface of the disks for each head. However, this causes two problems. First, encoding the information onto the disk itself wastes storage area that could be used to store data. Secondly, the sector marks which are stored on the data surface are susceptible to media defects. Either a defect on a storage surface can masquerade as a false sector mark or a true sector mark will not be readable because of a media defect. Either one of those scenarios causes problems in locating and retrieving data.

Accordingly, a principal object of the present invention is to overcome the problems encountered by the use of soft sectoring, or storing sector marks directly on the data surface. A further object of the present invention is to provide a system wherein the head may change zones and the system quickly ascertains the sector start locations in the new zone.

SUMMARY OF THE INVENTION

In accordance with the present invention, a hard disk drive assembly, including a microprocessor, a plurality of hard disks for storing digital information, a circuit for generating a high frequency clock signal synchronized to the rotation of the disks and a circuit for generating an index signal at a predetermined angular orientation of the disks, provides the operating environment for a sector pulse generator circuit. The sector pulse generator includes an angular position counter which maintains an angular position count which corresponds to the angular position of the read/write heads of the disk drive. The angular position counter is coupled to receive the high frequency clock signal and the index signal. The index signal causes the angular position count to reset to zero and each high frequency clock pulse causes the count to increment. The sector counter which has a sector count, is coupled to receive a sector length in terms of angular position counts from the microprocessor and increments the sector count by the sector length in response to an increment signal. A sector limit register is coupled to receive the number of full data-bearing sectors in a track multiplied by the sector length in angular position counts from the microprocessor.

Finally, a pulse generator is coupled to receive the angular position count from the angular position counter, the sector count from the sector counter and the number of full sectors in a track multiplied by the sector length in angular position counts from the sector limit register. The pulse generator compares the angular position count with the sector count and generates a sector pulse when the angular position count equals the sector count and those two values are less than the sector limit. The pulse generator also generates the increment signal for the sector counter when the angular position count exceeds the sector count.

Other objects, features and advantages of the invention will become apparent from a consideration of the following detailed description and the accompanying drawings.

BRIEF DESCRIPTION OF THE DRAWINGS

FIG. 1 is a block diagram of a prior art sector pulse generator.

FIG. 3 is a graphic representation of the index pulses and the angular position count over time.

FIG. 4 is a graphic representation of the count contained in the APC, the count contained in the adder and sector pulses over time.

FIG. 5 is a flow diagram of the steps involved in changing zones.

DETAILED DESCRIPTION OF THE INVENTION

Figure 2:
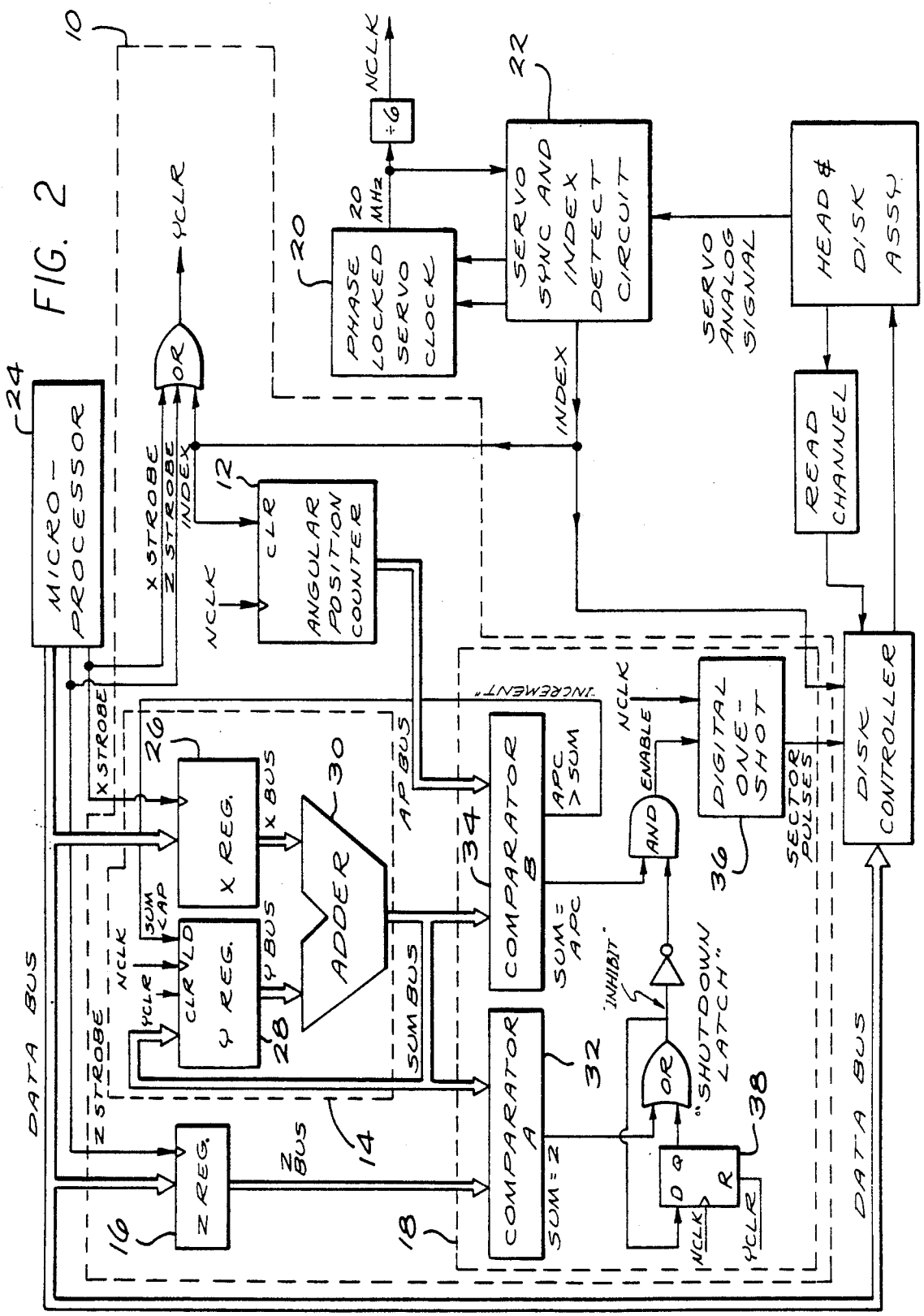
FIG. 2 is a block diagram of the preferred embodiment of the present invention.

A preferred embodiment of a sector pulse generator for a hard disk drive assembly is contained within the dashed box generally indicated as 10 in FIG. 2. The sector pulse generator includes an angular position counter 12 (APC), a sector counter 14, a sector limit register 16 and a pulse generator 18.

Before beginning a more detailed description of the embodiment shown in FIG. 2, the overall mode of operation will be briefly described. The APC 12 maintains a count (based on the high frequency clock signal NCLK) which corresponds to the read/write heads, angular position over the disk. This count is indicated as "angular position count" in FIG. 3 and APC in FIG. 4.

The sector counter 14 generates (at the output of the adder 30) a sector count in angular position counts. The sector count indicates the APC count at which the next sector pulse (indicating the beginning of a new sector) should be issued. When the APC count reaches the sector count, a sector pulse is generated, as shown in FIG. 4.

When the APC count exceeds the sector count, the sector count is incremented by the number of angular position counts in a sector, the sector length, in the current track (stored in the X-register 36). The increment is indicated by the vertical portion of the stepped line labeled "sum" in FIG. 4.

When the read/write heads change to a zone with a different sector count, the following occurs. First, the number of angular position counts in a sector, the new sector length, is stored in the sector counter 14 by the microprocessor 24. The output of the adder 30, the sector count, now equals the new sector length. If the APC count exceeds the new sector length (the heads are beyond and the first sector in the track), the sector counter 14 will increment by the new sector length at each clock pulse (catch up) until the sector count equals or exceeds the APC count. A more detailed description of the system's operation is given later.

Figure 6:
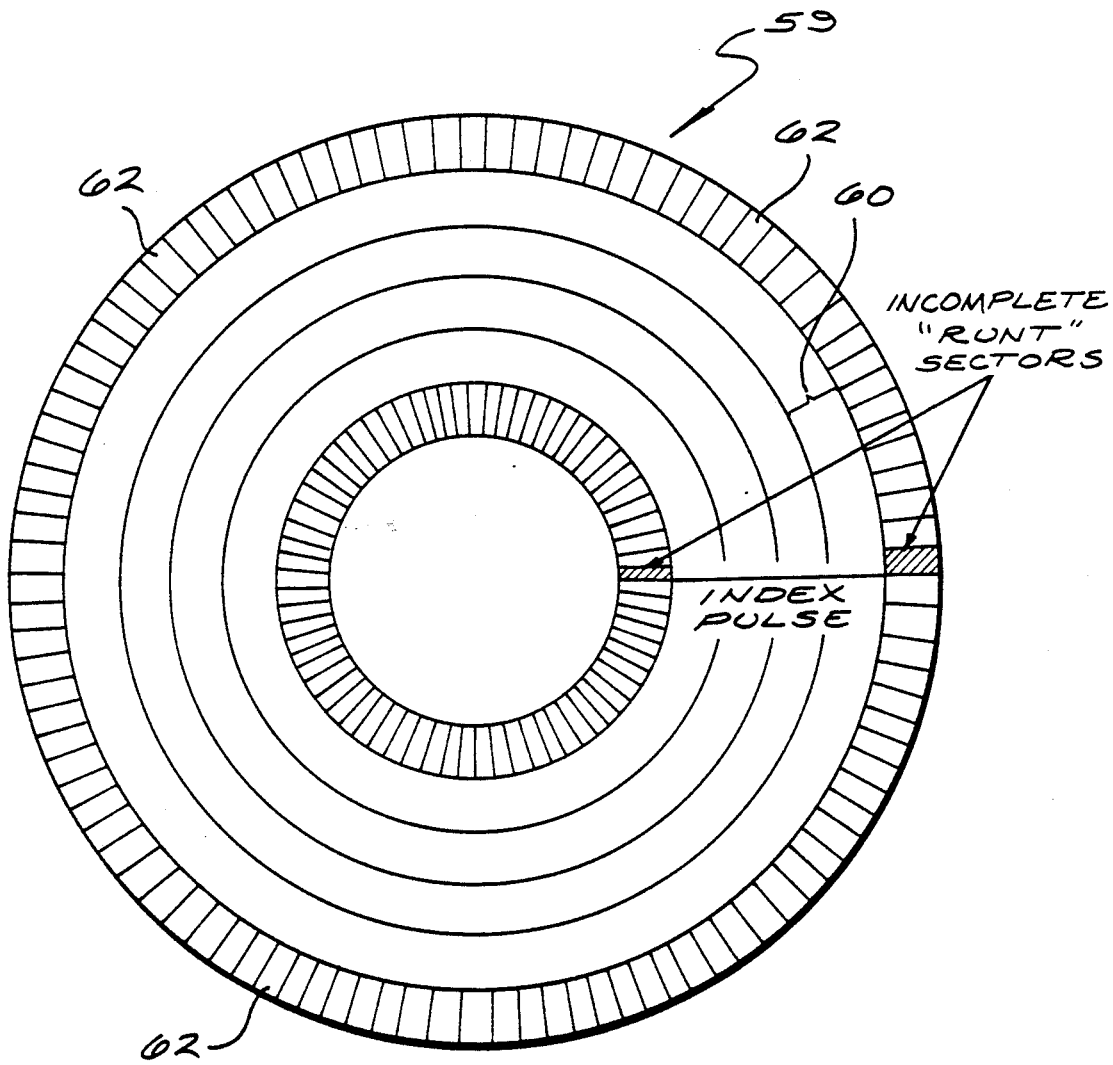
FIG. 6 is a pictorial representation of the storage of a disk.

Referring to FIG. 2, a sector pulse generator 10 is preferably for use in a hard disk drive assembly. The hard disk drive assembly includes a plurality of hard disks for storing digital information. Referring now to FIG. 6, the hard disks (one of which is indicated generally as 59) are configured to store information in a plurality of circular tracks which are grouped into zones 60. The zones 60, and the tracks within the zones, are subdivided into sectors 62.

Referring again to FIG. 2, the hard disk drive assembly also preferably includes a circuit for generating a high frequency clock signal 20 with the clock signal synchronized to the rotation of the disks. The hard disk drive assembly also includes a circuit for generating an index signal 22 at a predetermined angular orientation of the disks and a microprocessor 24.

The APC 12 contains a register which holds an angular position count, (first count). The APC 12 is coupled to receive the high frequency clock signal (NCLK) generated by the circuit for generating a high frequency clock signal 20. The APC 12 is also coupled to receive an index signal which is generated by the circuit for generating an index signal 22. The index signal (index) causes a register (not shown) within the angular position counter 12 to reset to zero. Each pulse of the NCLK signal causes the register to increment by one.

The sector counter 14 is coupled to receive a sector length in terms of angular position counts which is the number of NCLK pulses contained within the sectors in a specified track from the microprocessor 24. The sector counter 14 is also coupled to receive an increment signal from the pulse generator 18. Each time the increment signal is received the sector counter increments by the sector length.

The sector limit register (Z register) 16 is coupled to receive the number of full sectors in a track multiplied by the sector length from the microprocessor 24. The sector limit register stores that value.

The pulse generator 18 is coupled to receive the angular position count in the APC 12. The pulse generator 18 is also coupled to receive the sector count (second count) in the sector counter 14, and the value stored in the sector limit register 16. The pulse generator compares the value received from the APC 12 with the value received from the sector counter 14 and generates a sector pulse when the value received from the APC 12 equals the value received from the sector counter 14 and the value received from the sector count is less than the value received from the sector limit register 16.

The pulse generator 18 also generates an increment signal when the value received from the sector counter 14 is less than the value received from the APC 12. That signal causes the sector counter 14 to increment.

In a preferred embodiment of the present invention, the sector counter 14 further includes an X-register 26, a Y-register 28 and an adder 30. The X-register 26 is coupled to receive and store the sector length from the microprocessor 24. It is also coupled to receive the X strobe which causes the register to load, also from the microprocessor 24.

The adder 30 is coupled to receive the value stored in the X register 26 along the X bus and the value stored in the Y register 28 along the Y bus. The adder outputs the sum of those two values onto the sum bus.

The Y-register 28 is coupled to receive and store the value output by the adder 30 onto the sum bus. The Y-register is also coupled to receive the YCLR signal which is an ORing of the X strobe, the Z strobe (both of which are generated by the microprocessor 24) and the index. The YCLR signal causes the Y-register to clear. The Y-register loads the value present on the sum bus when it receives the signal from the pulse generator which indicates that the value on the sum bus is less than the value stored in the angular position counter.

In a preferred embodiment, the pulse generator 18 further includes comparator-A 32, comparator-B 34, and a digital one-shot 36. Comparator-B is coupled to receive the sum from the adder 30 on the sum bus and the value stored in the APC 12 along the AP bus. Comparator-B generates an increment signal which goes to the Y-register 28, when the value on the sum bus is less than the count of the APC 12. Comparator-B generates another signal when the value on the sum bus equals the value on the AP bus.

Comparator-A is coupled to receive the value in the sector limit register 16 (the Z register) along the Z bus.

Comparator-A is also coupled to receive the value output by the adder 30 along the sum bus. Comparator-A and its associated logic issue an inhibit signal when the value on the sum bus equals the value on the Z bus.

The digital one-shot 36 receives an enable signal which is the logical and of the inhibit signal from comparator-A and the signal generated by comparator-B 34 when the value on the sum bus equals the value on the AP bus. The digital one-shot is also coupled to receive the NCLK signal which is the high frequency clock signal. The digital one-shot produces a sector pulse, indicating the beginning of a sector, when it is enabled by the enable signal and when the high frequency clock signal pulse is present.

In operation, the sector pulse generator operates as follows. In a preferred embodiment of the present invention the time it takes for one revolution of the disks is divided into 55,552 equal time cells. A cell would be 300 nanoseconds at 3600 RPM or 200 nanoseconds at 5400 RPM. The number 55,552 comes from the fact that there are exactly 166,656 cycles of the 100 nanosecond clock (which is derived from the servo motor which spins the disks) in one revolution at 3600 RPM.

The index signal (indicating the arbitrary "beginning" of a revolution) is generated by the hard disk drive assembly at a predetermined angular orientation of the disks. The index signal clears the APC 12 to zero. On every clock pulse, the APC 12 is incremented by one. FIG. 3 shows the pulse count in the APC 12 steadily increasing and then being reset to zero at each index pulse. Preferably, the APC contains a 16 bit register for this function. The index signal also clears the Y-register 28.

On every clock pulse (300 nanoseconds at 3600 RPM) the APC is incremented and the result is compared to the sum of the Y-register and the X-register by comparator-B 34. If the APC equals this sum, then a sector pulse is generated. On the following clock pulse, the APC exceeds the sum, and the Y-register is stuffed with the sum of Y and X. This procedure is repeated for the entire revolution. In this fashion, the only values that the sum can be equal to are X, 2X, 3X, 4X, etc. FIG. 4 shows the sum increasing by the value X, one vertical step, each time the APC exceeds the sum. The APC exceeding the sum is indicated by the straight APC line intersecting and passing slightly above the sum. When the APC reaches the value in the Z-register, with the two values being compared in comparator-A 32, an inhibit signal is generated by comparator-A and no more sector pulses can be generated until the index signal is generated again which creates the YCLR which resets the DQ flipflop 38 to 0.

One of the advantages of the present invention is that the read write heads may change zones (each zone having a different number of sectors per revolution) without having to wait for index to re-sync the sector pulse generator.

In a preferred embodiment of the present invention, when the read/write heads seek a new location the following occurs. Turning now to FIG. 5, the disk controller first issues a seek command, Box 51. The microprocessor then determines if the location being sought is in a different or new zone from then current zone, Box 53. If a new zone is not sought, "end," the microprocessor is done with respect to locating the zone location, Box 55. However, if the location being sought is in a new zone, "yes," the microprocessor looks up the X and Z values for the new zone from the zone table, Box 57. The microprocessor then loads the X value into the X-register (26 in FIG. 2) and the Z value into the Z-register (16 in FIG. 2), Box 59. Turning now to FIG. 2, each time the X and Z registers are loaded the YCLR signal is generated which clears the Y-register 28 and resets the DQ flip-flop 38.

If the read write heads change zones in the middle of a revolution, when the value in the APC is compared to the sum of the X and Y registers by comparator-B 34, the circuit detects that the APC value exceeds the sum. Therefore, on the next clock pulse, the Y register is loaded with the value X+Y. This sum goes through the values X, 2X, 3X, etc. on each clock pulse until the sum meets or exceeds the APC value. This "catch up" happens very quickly and waiting for index is not required. However, if index happens during the catchup phase, the index pulse causes the APC and the Y register to reset to zero so that the circuit is synched.

It is also significant to note that the sector pulses' locations are not aligned with physical byte boundaries. Sufficient tolerance must be built into the sector format to accommodate sector pulse placement. Ordinarily, this does not mean that extra bytes need to be added to the format typically utilized. Only the organization and utilization of the bytes need be changed.

It is to be understood that the disclosed apparatus and method are merely illustrative of the principles of the present invention which could be implemented by other types of structures performing the same or similar functions as those structures described herein. For example, it should be understood by those skilled in the art that sector pulses could also be generated when APC is one greater or one less than the sector count, under which conditions, the two counts are essentially equal, for the purpose of operation of the system. If the sector pulses are generated when the APC exceeds the sector count, then sector pulses must be suppressed during "catch up." Accordingly, the scope of the present invention is not limited to the embodiment as shown in the drawings and specifically described herein.

What is claimed is:

1. For use in a hard disk drive assembly having a microprocessor, a plurality of hard disks for storing digital information, each of said hard disks configured to store information in a plurality of circular tracks with said tracks being divided into sectors, a circuit for generating high frequency pulses synchronized to the rotation of said disks, and a circuit for generating an index signal at a predetermined angular orientation of said disks, a sector pulse generator comprising:

an angular position counter having an angular position register, said angular position counter coupled to receive said high frequency pulses and said index signal, said index signal causing said register to reset to zero and each high frequency pulse causing said register to increment, whereby said register stores the current position of said disks;

a sector counter having a length register, said sector counter coupled to receive a sector length in terms of angular position counts from said microprocessor and incrementing said length register by said sector length in response to an increment signal;

a sector limit register coupled to receive the number of full sectors in a track multiplied by the sector length from said microprocessor and to store said number;

a pulse generator coupled to receive the first count of said angular position counter, the second count of said sector counter, and the number of full sectors in a track multiplied by the sector length stored in said sector limit register, said pulse generator being constructed to compare the first count of said angular position counter with the second count of said sector counter and to generate a sector pulse when said angular position count equals said sector count and said sector count is less than said sector limit.

2. A sector pulse generator as defined in claim 1 wherein said sector counter further includes a first register for receiving and storing said sector length from said microprocessor, a second register, and an adder coupled to receive the values stored in said first and second registers and to output the sum of those two values, said second register being further coupled to receive said sum from said adder.

3. A sector pulse generator as defined in claim 2 wherein said pulse generator further includes a first comparator for comparing said sum from said adder with the count in said angular position counter, said comparator issuing a greater than signal when said count is greater than said sum, said greater than signal causing said sector counter to increment, said comparator issuing an equal signal when said count equals said sum;
- a second comparator for comparing said count with the value stored in said sector limit register and issuing an inhibit signal when said count equals said value;
- a one shot pulse generator coupled to said first and said second comparators to receive said equal signal and said inhibit signal and constructed to generate a pulse when said equal signal is received and said inhibit signal is not received.

4. A sector pulse generator as defined in claim 3, said one-shot pulse generator further includes an and gate for outputting, an enable signal to said one-shot pulse generator which is the logical and of the logical not of said inhibit signal and said equal signal.

5. A sector pulse generator as defined in claim 4, further including a circuit for generating a clear signal, said circuit generating said clear signal when a new value is stored in said first register or when said index pulse is generated.

6. A sector pulse generator as defined in claim 5, wherein said second comparator further includes a logic circuit for producing said inhibit signal, said logic circuit producing said inhibit signal when said count equals said value and continuing to generate said inhibit signal until said clear signal is received.

7. A sector pulse generator as defined in claim 6 wherein said tracks on said disks are grouped into zones with all the tracks within one zone having the same number of sectors.

8. A sector pulse generator for hard disk drives comprising:
- a hard disk drive storage system including a plurality of hard disks for storing digital data, said disks including means for storing data in a substantial plurality of circular tracks located at different radii as measured from the center of said disks, and having more data and more sectors including groups of data in outer tracks than in inner tracks;
- means for providing high repetition rate angular position pulses synchronized with the rotation of said disks;
- an angular position counter coupled to receive said angular position pulses;
- means for providing index pulses at one predetermined angular orientation of said disks and for applying said index pulse to reset said angular position counter to zero;
- an adder for calculating and storing a sector count for the sector of the track associated with the instantaneous position of the magnetic heads of said hard disk drive;
- means for comparing the output of said adder to the output of the angular position counter and producing a sector pulse when said angular position counter output equals said adder output, and for incrementing said adder by the number of angular position counts in a sector of the track associated with the instantaneous position of the magnetic heads; and
- means for clearing the adder and substituting a new angular sector count therein when said disk drive shifts the position of said heads to a track having a different number of sectors and a different number of angular position counts in each sector.

9. A sector pulse generator for hard disk drives as defined in claim 8 wherein said tracks on said disks are grouped into zones with all the tracks within one zone having the same number of sectors.

10. A sector pulse generator for hard disk drives as defined by claim 9 wherein said adder and said means for clearing the adder includes a first register for receiving and storing a sector length, a second register, and an adder coupled to receive the value stored in said first and said second registers and to output the sum of those two values, said second register being further coupled to receive said sum from said adder.

11. A sector pulse generator for hard disk drives as defined by claim 10 wherein said angular position counter counts the number of angular position pulses received since the last index pulse.

12. A sector pulse generator for hard disk drives as defined by claim 11 further including a sector limit register for storing a value which corresponds to the number of whole sectors in the current track.

13. A sector pulse generator for hard disk drives as defined by claim 12 wherein said means for comparing includes:
- a first comparator for comparing said sum with the count in said angular position counter, said comparator issuing a greater than signal when said count is greater than said sum, said greater than signal causing said sector counter to increment by the value stored in said first register, said comparator issuing an equal signal when said count equals said sector count;
- a second comparator for comparing said count with the number stored in said sector limit register and issuing an inhibit signal when said count equals said value;
- a one-shot pulse generator coupled to said first and said second comparators to receive said equal signal and said inhibit signal and constructed to generate a pulse when said equal signal is received and said inhibit signal is not received.

14. A sector pulse generator as defined in claim 13, said one-shot pulse generator further including an and gate for outputting, an enable signal which is the logical and of the logical not of said inhibit signal and said equal signal.

15. A sector pulse generator as defined in claim 14, further including a circuit for generating a clear signal, said circuit generating said clear signal when a new value is stored in said first register or when said index pulse is generated.

16. A sector pulse generator as defined in claim 15, wherein said second comparator further includes a logic circuit for producing said inhibit signal, said logic circuit producing said inhibit signal when said count equals said value and continuing to generate said inhibit signal until said clear signal is received.

17. A method for generating sector pulses for use in a hard disk drive assembly having a microprocessor, a plurality of hard disks for storing digital information, each of said hard disks configured to store information in a plurality of circular tracks, with said tracks being divided into sectors, a circuit for generating high frequency pulses synchronized to the rotation of said disks, and a circuit for generating an index signal at a predetermined angular orientation of said disks, comprising the steps of:

resetting an angular position count to zero when the index signal occurs;

maintaining a count of the number of high frequency pulses occurring after the index signal in the angular position count;

storing a sector length in the sector counter and incrementing the sector counter by the number of pulses in a sector in the current track each time the value in the sector counter is less than the angular position count;

generating a sector pulse when the angular position count equals the value in the sector counter;

resetting the sector counter to the number of pulses in a sector in the current track each time the read write heads move to a new track having a different number of sectors therein.

18. The method defined in claim 17 further including the steps of:

receiving a seek command;

determining if the location being sought by the seek command is in a new zone;

if a new zone is sought, looking up the sector length and number of complete sectors for the new zone; and loading the new sector length into the sector counter and loading the new number of complete sectors.

19. A method as defined in claim 17 wherein said sector pulses are only generated when the value in the sector counter indicating the number of sectors is less than the number of full sectors in the current track.

* * * * *

Adverse Decisions In Interference

Patent No. 5,068,755, Robert G. Hamilton, SECTOR PULSE GENERATOR FOR HARD DISK DRIVE ASSEMBLY, Interference No. 103,991, final judgment adverse to the patentees rendered May 8, 2000, as to claims 8, 9, 17, 18, and 19.
*(Official Gazette July 4, 2000)*